(12) United States Patent
Kumru et al.

(10) Patent No.: US 10,787,395 B2
(45) Date of Patent: Sep. 29, 2020

(54) TWO-COMPONENT MORTAR MASS AND USE THEREOF

(71) Applicant: Hilti Aktiengesellschaft, Schaan (LI)

(72) Inventors: Memet-Emin Kumru, Augsburg (DE); Thomas Bürgel, Landsberg (DE); Bernhard Leitner, Landsberg a. Lech (DE)

(73) Assignee: Hilti Aktiengesellschaft, Schaan (LI)

( * ) Notice: Subject to any disclaimer, the term of this patent is extended or adjusted under 35 U.S.C. 154(b) by 23 days.

(21) Appl. No.: 16/330,121

(22) PCT Filed: Sep. 20, 2017

(86) PCT No.: PCT/EP2017/073705
§ 371 (c)(1),
(2) Date: Mar. 4, 2019

(87) PCT Pub. No.: WO2018/054935
PCT Pub. Date: Mar. 29, 2018

(65) Prior Publication Data
US 2019/0233339 A1    Aug. 1, 2019

(30) Foreign Application Priority Data
Sep. 26, 2016   (EP) ..................................... 16190553

(51) Int. Cl.
| | | |
|---|---|---|
| C04B 14/30 | (2006.01) | |
| C04B 40/06 | (2006.01) | |
| C04B 24/26 | (2006.01) | |
| C04B 26/06 | (2006.01) | |
| C04B 28/00 | (2006.01) | |
| C04B 28/06 | (2006.01) | |
| C04B 28/26 | (2006.01) | |
| C04B 111/00 | (2006.01) | |
| C04B 103/00 | (2006.01) | |
| C04B 103/14 | (2006.01) | |
| C04B 103/44 | (2006.01) | |

(52) U.S. Cl.
CPC .......... *C04B 40/065* (2013.01); *C04B 14/303* (2013.01); *C04B 24/2641* (2013.01); *C04B 26/06* (2013.01); *C04B 28/008* (2013.01); *C04B 28/06* (2013.01); *C04B 28/26* (2013.01); *C04B 40/0666* (2013.01); *C04B 2103/0085* (2013.01); *C04B 2103/0088* (2013.01); *C04B 2103/14* (2013.01); *C04B 2103/44* (2013.01); *C04B 2111/00715* (2013.01); *Y02P 40/165* (2015.11)

(58) Field of Classification Search
CPC .................................................... C04B 14/303
See application file for complete search history.

(56) References Cited

U.S. PATENT DOCUMENTS

| | | | |
|---|---|---|---|
| 3,890,157 A | * | 6/1975 | Babcock ................. C04B 22/00 106/680 |
| 5,228,913 A | | 7/1993 | Hinterwaldner et al. |
| 5,531,546 A | | 7/1996 | Herdlicka et al. |
| 5,565,026 A | | 10/1996 | Hense et al. |
| 5,854,305 A | | 12/1998 | Schwiegk et al. |
| 8,440,278 B2 | | 5/2013 | Pfeil |
| 8,828,289 B2 | | 9/2014 | Grun et al. |
| 9,523,029 B2 | | 12/2016 | Buergel |
| 9,994,655 B2 | | 6/2018 | Gaefke et al. |
| 2011/0071234 A1 | | 3/2011 | Gross et al. |
| 2011/0073327 A1 | | 3/2011 | Buergel |
| 2012/0247985 A1 | | 10/2012 | Grun et al. |
| 2012/0315417 A1 | | 12/2012 | Pfeil |
| 2013/0237634 A1 | | 9/2013 | Buergel |
| 2015/0252124 A1 | | 9/2015 | Gaefke et al. |
| 2016/0083563 A1 | | 3/2016 | Grun et al. |
| 2016/0137552 A1 | | 5/2016 | Burgel et al. |
| 2016/0159689 A1 | | 6/2016 | Burgel et al. |

FOREIGN PATENT DOCUMENTS

| | | |
|---|---|---|
| DE | 195 31 649 | 3/1997 |
| DE | 199 56 509 | 1/2001 |
| DE | 10 2010 051 818 | 2/2012 |
| DE | 10 2011 077 248 | 9/2012 |
| DE | 10 2012 221 446 | 5/2014 |
| DE | 10 2014 013 799 | 3/2016 |
| DE | 10 2015 113 352 | 3/2016 |
| EP | 0 432 087 | 6/1991 |
| EP | 0 455 582 | 11/1991 |
| EP | 0 495 336 | 7/1992 |
| EP | 0 589 831 | 10/1996 |

(Continued)

OTHER PUBLICATIONS

Machine translation of EP0589831 (Year: 1994).*
International Search Report dated Oct. 20, 2017 in PCT/EP2017/073705.
Written Opinion dated Oct. 20, 2017 in PCT/EP2017/073705.

* cited by examiner

*Primary Examiner* — Wenwen Cai
(74) *Attorney, Agent, or Firm* — Grüneberg and Myers PLLC

(57) ABSTRACT

A two-component mortar mass includes a resin component (A), which contains as curable constituent at least one radically curable resin, and a curing component (B) which contains a curing agent for the radically curable resin of the resin component (A), wherein the resin component (A) and/or the curing component (B) contain(s) as further constituent at least one inorganic additive. The inorganic additive contains a transition aluminum oxide having an average particle size d50 of at least 7.0 μm and a pore diameter of 4.0 nm to 30.0 nm.

19 Claims, 2 Drawing Sheets

FOREIGN PATENT DOCUMENTS

| | | |
|---|---|---|
| EP | 1 935 860 | 6/2008 |
| EP | 2 314 556 | 4/2011 |
| EP | 2 829 525 | 1/2015 |
| EP | 2 371 782 | 12/2015 |
| WO | 2011/072789 | 6/2011 |
| WO | 2015/011180 | 1/2015 |

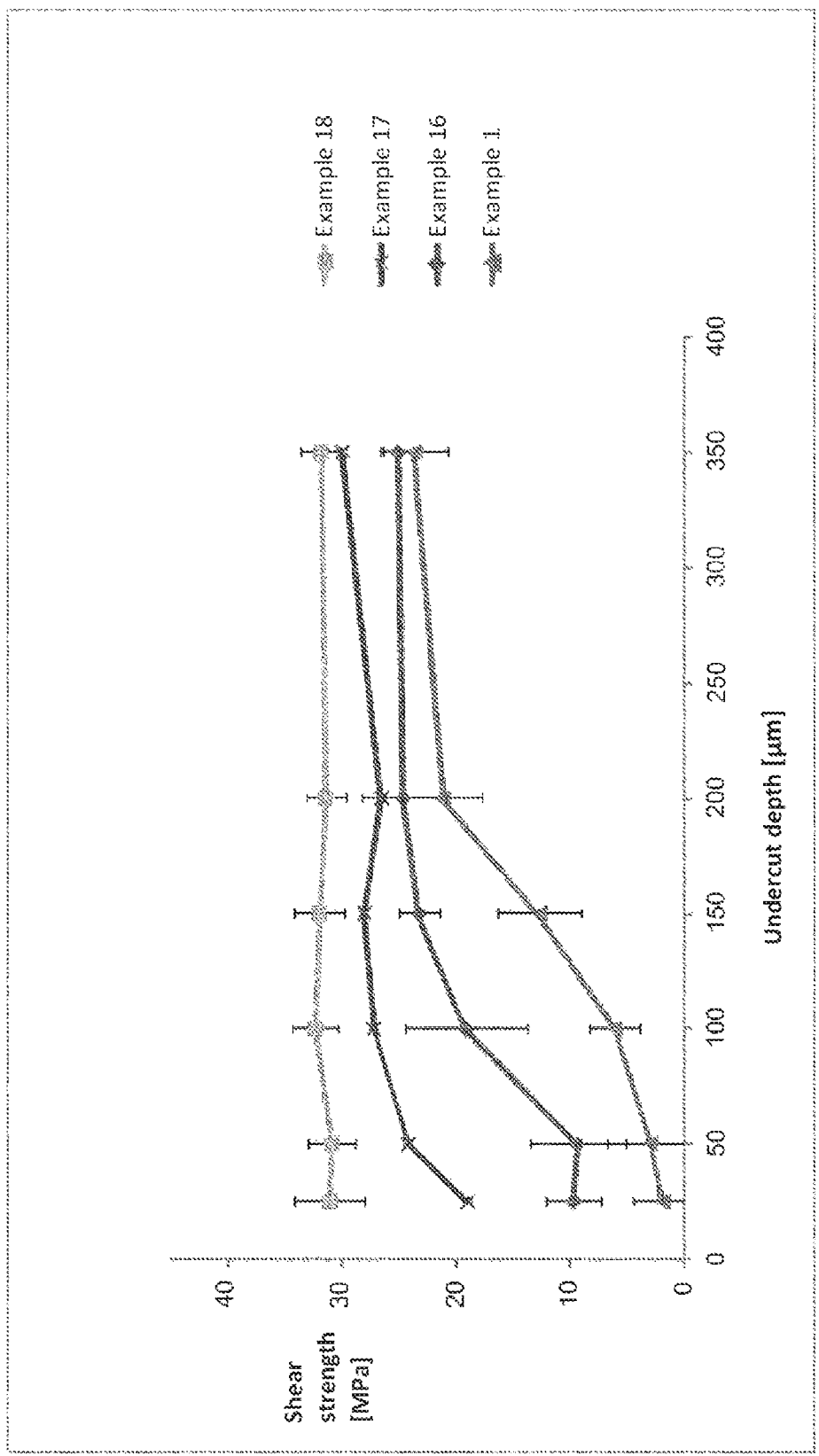

TWO-COMPONENT MORTAR MASS AND USE THEREOF

This application is a National Stage entry under § 371 of international Application No. PCT/EP2017/073705, filed on Sep. 20, 2017, and which claims the benefit of European Application No. 16190553.4, filed on Sep. 26, 2016.

The invention relates to a two-component mortar compound having a resin component (A), which comprises at least one free-radical-curing resin, and a hardener component (B) for the resin of the resin component (A). The subject matter of the invention is further the use of the mortar compound for chemical fastening of structural parts such as threaded anchor rods, rebars, threaded sleeves and screws in drilled holes, which are made in a mineral substrate.

For more secure fastening of structural parts, such as threaded anchor rods, rebars, threaded sleeves and screws in a mineral substrate such as concrete, natural rock or plaster, the drilled holes for receiving the structural parts to be fastened are first drilled with appropriate dimensions in the mineral substrate. Then the drilling dust is cleared from the drilled holes and the two-component mortar compound, after the resin component has been mixed with the hardener component, is introduced into the drilled hole. Thereupon the structural part to be fastened is introduced into and adjusted in the drilled hole filled with mortar compound. After the mortar compound has cured due to reaction of the resin component with the hardener component, a firm grip of the structural part in the mineral substrate is established.

The load-bearing capacity of the structural parts fastened in this way depends on several influencing variables, which are usually classified as internal and external variables. The internal influencing variables include the chemical composition of the mortar compound, the process by which it is manufactured and the packaging of the mortar compound, which typically comprises components present in two separate containers.

The external influencing variables include, among others, the way in which the drilled holes are cleaned, the quality of the mineral substrate, for example of concrete, its wetness and its temperature as well as the way in which the drilled holes are produced.

From EP 0 432 087 and EP 0 589 831, two-component mortar compounds based on urethane (meth)acrylate resins are known that cure by free-radical polymerization.

The mortar compounds based on free-radical-curing reactive resins, known in the prior art and used as chemical bonded anchors, already exhibit good load ratings in dry and wet drilled holes. However, the polymerization shrinkage that occurs during curing of the reactive resins leads to a decrease of the mortar volume. Thereby a decrease of performance of the bonded anchor may occur.

Compared with the known prior art, a further need therefore exists for two-component mortar compounds that have good adhesion in drilled holes, that are easy to process and that have improved mechanical properties.

In particular, the object is to provide a mortar compound, based on free-radical-curing reactive resins, that can be used as chemical bonded anchors and that has durably good load ratings.

It has been surprisingly found that this object is solved by a two-component mortar compound.

Preferred embodiments of the inventive mortar compound are specified in the dependent claims, which optionally may be combined with one another.

Subject matter of the invention is further the use of the compound for chemical fastening of structural parts such as threaded anchor rods, rebars, threaded sleeves and screws in drilled holes, which are present in a mineral substrate, preferably concrete.

In its general form, the invention comprises a two-component mortar compound having a resin component (A), which as the curable ingredient contains a free-radical-curing resin, and a hardener component (B), which contains a hardening agent for the free-radical-curing resin of the resin component (A), wherein the resin component (A) and/or the hardener component (B) contains at least one inorganic additive as a further ingredient. According to the invention, the inorganic additive comprises a transition alumina having a mean particle size d50 of at least 7.0 µm and a pore diameter in a range of 4.0 nm to 30 nm.

Both in dry, cleaned drilled holes and in half-cleaned and/or wet drilled holes, the fastening of structural parts using the inventive two-component mortar compound yields high load ratings, which are significantly increased compared with conventional compounds and moreover remain stable over long time. Surprisingly, the use of transition aluminas leads, starting from a particular mean particle size in combination with a pore diameter in a selected range, to a significant reduction of the polymerization shrinkage, not achieved with other aluminas such as corundum or fillers with high specific surface, such as porous silica gels. The curing curve of the compound does not change when a transition alumina is used that reduces the polymerization shrinkage. The only difference is a shorter time to the onset of curing.

Within the meaning of the invention, a "two-component mortar compound" will be understood as a mortar compound that consists of a curable resin component and a hardener component for the resin component, wherein the resin component and the hardener component are stored separated from one another, so that no reaction of the hardener component with the resin component takes place during storage. Curing of the reactive resin is started by mixing the hardener component with the reactive resin immediately before use of the mortar compound.

Transition aluminas are aluminas that do not exist in the thermodynamically stable corundum phase (α-alumina). α-Alumina is formed by heating aluminum hydroxides such as boehmite of bayerite to high temperatures of above 1000° C. At lower calcining temperature, on the other hand, the so-called transition aluminas are formed, the crystal phase of which may vary depending on calcining temperature and starting material. The transition aluminas have high porosity and high specific surface. In addition, transition aluminas are also described as active, since they possess catalytic properties and are able to adsorb molecules by chemisorption.

The mean particle size d50 is understood as the median of the particle-size distribution, at which 50% of all particles in the investigated sample are smaller than the indicated d50 value.

"Pore diameter" means the most frequent pore diameter determined in the sample by nitrogen adsorption and desorption.

Preferably, the inorganic additive comprises at least one transition alumina as well as further substances, which are selected from the group consisting or inorganic fillers, hydraulically binding or polycondensable inorganic compounds, modifiers and mixtures thereof.

Particularly preferably, the inorganic additives comprises a filler, which may be contained in the resin component (A) and/or in the hardener component (B).

Examples of suitable fillers are quartz, glass, corundum, porcelain, stoneware, heavy spar, light spar, gypsum, talc and/or chalk as well as mixtures thereof in the form of sand, flour or shaped bodies, preferably in the form of fibers or beads.

According to a further preferred embodiment of the invention, the inorganic additive further comprises a hydraulically binding or polycondensable inorganic compound, such as cement or gypsum, preferably iron-oxide-free or iron-oxide-low cement such as aluminate cement. The hydraulically binding or polycondensable inorganic compound is preferably contained in the hardener component (A). In this case, the hardener component (B) comprises not only the hardening agent and the water optionally contained for phlegmatization of the hardening agent but also additional water for curing of the hydraulically binding or polycondensable inorganic compound.

Finally, the inorganic additive in the resin component (A) and/or in the hardener component (B) may contain still further inorganic modifiers such as thickeners, plasticizers and thixotropic agents, for example precipitated or fumed silica, bentonites and/or kaolin.

According to a preferred embodiment, the transition alumina is present in the mortar compound in a proportion of 0.5 to 10 percent by volume, preferably 1 to 8 percent by volume. When the proportions of the transition alumina are smaller than 0.5 percent by volume, no marked reduction of the polymerization shrinkage is achieved. When the proportions of the transition alumina are higher than 10 percent by volume, the polymerization shrinkage of the mortar compound may increase again and processing of the compound may be more difficult.

The mean particle size d50 of the transition alumina is preferably at least 12.0 μm, preferably at least 14.0 μm, further preferably at least 25.0 μm and particularly preferably at least 35 μm. By use of transition aluminas having the indicated mean particle sizes d50, the polymerization shrinkage of the mortar compound can be reduced to less than 3%, preferably less than 2.5%, further preferably to less than 2% or even to less than 1%. Here and in the following, polymerization shrinkage means the percentage thickness change of a mortar bed before and after curing. A further increase of the mean particle size no longer appears to influence the polymerization shrinkage substantially. The upper limit of the mean particle size d50 may therefore be chosen freely from the viewpoint of free-flowing capability and processing of the mortar compound.

Preferably, transition aluminas having a mean particle size d50 of up to 120 μm are used.

According to a further preferred embodiment, the transition alumina used in the inventive mortar compound has a pore diameter in a range of 4 nm to 15 nm. Non-porous α-alumina does not exhibit any reduction of the polymerization shrinkage. Transition aluminas having pore diameters greater than 30 nm likewise exhibit a less intensive reduction of the polymerization shrinkage than such having comparable mean particle size d50 but smaller pore diameter.

The inorganic additives, including the transition alumina, may be present in the mortar compound in a proportion of 50 to 80 percent by weight relative to the total weight of the compound. When the inorganic additives are present in proportions higher than 80 percent by weight, the compounds can no longer be processed reliably since, due to the high viscosity of the high-fill compounds, homogeneous mixing can no longer be achieved. Low-fill compounds can indeed be used in principle, but are less preferred.

The free-radical-curing resin in component (A) of the mortar compound preferably comprises a urethane (meth)acrylate resin and/or a (meth)acrylate-modified epoxy resin.

For production of a suitable urethane (meth)acrylate resin, an at least difunctional isocyanate may be reacted with one or more hydroxyfunctional, ethylenically unsaturated compounds, especially with hydroxyfunctional (meth)acryl compounds.

The at least difunctional isocyanate for production of the urethane (meth)acrylate resin may be an aromatic isocyanate, an aliphatic isocyanate, especially a cycloaliphatic isocyanate and an isocyanate-group-containing prepolymer sein, which may also be used in a mixture with one another.

Examples of suitable aliphatic and aromatic isocyanates include m-phenylene diisocyanate, toluylene-2-4-diisocyanate, toluylene-2-6-diisocyanate, hexamethylene-1,6-diisocyanate, tetramethylene-1,4-diisocyanate, cyclohexane-1,4-diisocyanate, hexahydrotoluylene diisocyanate, naphthylene-1,5-diisocyanate, methoxyphenyl-2,4-diisocyanate, diphenylmethane-4,4'-diisocyanate, 4,4'-biphenylene diisocyanate, 3,3'-dimethoxy-4,4'-biphenyl diisocyanate, 3,3'-dimethyl-4,4'-biphenyl diisocyanate, 3,3'-dimethyldiphenylmethane-4,4'-diisocyanate, 4,4',4''-triphenylmethane triisocyanate, polymethylene polyphenyl isocyanate (PMDI), toluylene-2,4,6-triisocyanate and 4,4'-dimethyldiphenylmethane-2,2',5,5'-tetraisocyanate.

Diphenylmethane-4,4'-diisocyanate, diphenylmethane-2,4'-diisocyanate and mixtures thereof are known collectively as MDI and may all be used. Toluylene-2,4-diisocyanate, toluylene-2,6-diisocyanate and mixtures thereof are known generally as TDI and all may likewise be used.

Preferably, the polyisocyanate is selected from the group consisting of diphenylmethane diisocyanate (MDI), polymeric diphenylmethane diisocyanate (PMDI), toluylene diisocyanate (TDI), hexane diisocyanate (HDI), isophorone diisocyanate (IPDI) and mixtures thereof.

Isocyanate prepolymers, which are produced by reaction of a stoichiometric excess of any desired polyisocyanate with an isocyanate-reactive compound as a chain-lengthening agent, may also be used, optionally in the mixture with the above-mentioned aromatic and aliphatic isocyanates.

Examples of such chain-lengthening agents are dihydric alcohols such as ethanediol, diethylene glycol, triethylene glycol and polyethylene glycol, propanediol, dipropylene glycol, tripropylene glycol and polypropylene glycol, 1,4-butanediol, 1,6-hexanediol, neopentyl glycol and diethanolamine, furthermore aromatic alcohols such as bisphenol A and bisphenol F or their ethoxylation products, hydrogenation products and/or halogenation products, higher-hydric alcohols such as glycerol, trimethylolpropane, hexanetriol and pentaerythritol, hydroxyl-group-containing polyethers such as, for example, oligomers of aliphatic or aromatic oxiranes and/or higher cyclic ethers, for example of ethylene oxide, propylene oxide, styrene oxide and furan, polyethers that contain aromatic structural units in the main chain, such as, for example, polyethers of bisphenol A and F, as well as hydroxyl-group containing polyesters on the basis of the above-mentioned alcohols and polyethers with dicarboxylic acids or their anhydrides, such as adipic acid, phthalic acid, tetra- or hexahydrophthalic acid, HET acid, maleic acid, fumaric acid, itaconic and sebacic acid.

Chain-lengthening agents having aromatic structural units are used for stiffening the chain of the resin. Hydroxyl compounds having unsaturated structural units such as fumaric acid may be used to increase the cross-linking density during curing. Branched or star-shaped hydroxyl compounds as chain-lengthening agents, especially trihydric and higher-hydric alcohols as well as polyethers and/or polyesters that contain their structural units yield branched or star-shaped urethane (meth)acrylates that impart lower viscosity to the resin and improved solubility in reactive diluents.

The hydroxyfunctional (meth)acryl compound for production of the urethane (meth)acrylate resin of the resin component (A) is preferably a (meth)acrylic acid hydroxyalkyl ester, such as hydroxyethyl (meth)acrylate, hydroxypropyl (meth)acrylate, polyoxyethylene (meth)acrylate, polyoxypropylene (meth)acrylate, or a hydroxyl-group-containing (meth)acrylic acid ester of multihydric alcohols such as pentaerythritol tri(meth)acrylate, glycerol di(meth)acrylate, trimethylolpropane di(meth)acrylate and neopentylglycol mono(meth)acrylate.

The designation "(Meth)acryl . . . " or " . . . (meth)acryl . . . " used here and in the following means that both the acryl group and the methacryl group are to be understood by this designation.

The reaction of the at least difunctional isocyanate with the hydroxyfunctional, ethylenically unsaturated compound takes place in such a way that the free-radical-polymerizable resin of the resin component (A) so obtained is substantially free of isocyanate groups. Essentially free means here that the resin has an NCO content of less than 2%, preferably less than 1% and particularly preferably less than 0.3%. For this purpose, the hydroxyfunctional, ethylenically unsaturated compound is used in a stoichiometric excess relative to the isocyanate groups.

As examples of further free-radical-polymerizable resins, vinyl esters, epoxy (meth)acrylates, unsaturated polyester resins and mixtures thereof may be used, alone or together with the (poly)urethane (meth)acrylate described hereinabove.

Unsaturated polyester resins are obtained by reacting unsaturated dicarboxylic acids such as o-phthalic acid and/or isophthalic acid, maleic acid and fumaric acid with dihydric alcohols.

As epoxy (meth)acrylates, usually condensates of (meth) acryl acid with glycidyl ethers of bisphenol A, bisphenol F or novolacs are used.

The free-radical-polymerizable resin is preferably present in a proportion of 10 to 35 percent by weight in the mortar compound.

According to a preferred embodiment of the invention, the resin component (A) contains at least one reactive diluent having at least one ethylenically unsaturated group as a further ingredient in all embodiments described hereinabove. Suitable reactive diluents are in particular (meth) acrylate compounds as well as allyl and vinyl compounds.

Suitable reactive diluents are described in EP 1 935 860 A1 and DE 195 31 649 A1. Preferably, the resin mixture contains, as reactive diluent, a (meth)acrylic acid ester, wherein aliphatic or aromatic $C_5$-$C_{15}$ (meth)acrylates are selected particularly preferably. Suitable examples include: hydroxypropyl (meth)acrylate, 1,2-ethanediol di-(meth) acrylate, 1,3-propanediol di(meth)acrylate, 1,2-butanediol di(meth)acrylate, 1,4-butanediol di(meth)acrylate (BD-DMA), trimethylolpropane tri(meth)acrylate, phenylethyl (meth)acrylate, tetrahydrofurfuryl (meth)acrylate, ethyl triglycol (meth)acrylate, N,N-dimethylaminoethyl (meth)acrylate, N,N-dimethylaminomethyl (meth)acrylate, acetoacetoxyethyl (meth)acrylate, isobornyl (meth)acrylate, 2-ethylhexyl (meth)acrylate, diethylene glycol di(meth) acrylate, methoxypolyethylene glycol mono(meth)acrylate, trimethylcyclohexyl (meth)acrylate, 2-hydroxyethyl (meth) acrylate, dicyclopentenyloxyethyl (meth)acrylate and/or tricyclopentadienyl di(meth)acrylate, bisphenol A (meth)acrylate, novolac epoxy di(meth)acrylate, di-[(meth)acryloylmaleoyl]-tricyclo-5.2.1.0.$^{2.6}$-decane, dicyclopentenyloxyethyl crotonate, 3-(meth)acryloyl-oxymethyl-tricylo-5.2.1.0.$^{2.6}$-decane, 3-(meth)cyclo-pentadienyl (meth)acrylate, isobornyl (meth)acrylate and decalyl-2-(meth)acrylate; PEG di(meth)acrylates, such as PEG 200 di(meth)acrylate, tetraethylene glycol di(meth)acrylate, solketal (meth)acrylate, cyclohexyl (meth)acrylate, phenoxyethyl di(meth)acrylate, methoxyethyl (meth)acrylate, tetrahydrofurfuryl (meth)acrylate, tert-butyl (meth)acrylate and norbornyl (meth)acrylate.

In principle, other customary free-radical-polymerizable compounds may also be used, alone or in a mixture with the (meth)acrylic acid esters, e.g. styrene, α-methylstyrene, alkylated styrenes, such as tert-butylstyrene, divinylbenzene and allyl compounds, wherein the the representatives thereof that are not subject to labeling are preferred.

Particularly preferred reactive diluents are hydroxypropyl (meth)acrylate, 1,4-butanediol di(meth)acrylate and butanediol-1,2-di(meth)acrylate.

The reactive diluent is used on the one hand as solvent for the free-radical-polymerizable resin and on the other hand as a comonomer, which participates in the free-radical polymerization of the resin component. The use of reactive diluents leads to a further improvement of the adhesion of the cured mortar compound to the surfaces of the mineral substrate and/or of the structural part to be fastened.

The reactive diluent is present in the mortar compound preferably in a proportion of 0 to 25 percent by weight, particularly preferably of 4 to 25 percent by weight. All free-radical-polymerizable compounds are present in the mortar compound preferably in a proportion of up to 50 percent by weight at most. The weight ratio of reactive diluent to free-radical-curing resin may preferably lie in a range of 2:1 to 1:5, preferably 2:1 to 1:2.

According to a further preferred embodiment of the invention, the resin component (A) contains at least one accelerator for the hardening agent. Suitable accelerators, which are normally added to the resin mixture, are known to the person skilled in the art. These are, for example, amines, preferably tertiary amines and/or metal salts.

Suitable amines are selected from among the following compounds, which are described, for example, in US Application 2011071234 A1: dimethylamine, trimethylamine, ethylamine, diethylamine, triethylamine, n-propylamine, di-n-propylamine, tri-n-propylamine, isopropylamine, diisopropylamine, triisopropylamine, n-butylamine, isobutylamine, tert-butylamine, di-n-butylamine, diisobutylamine, triisobutylamine, pentylamine, isopentylamine, diisopentylamine, hexylamine, octylamine, dodecylamine, laurylamine, stearylamine, aminoethanol, diethanolamine, triethanolamine, aminohexanol, ethoxyaminoethane, dimethyl-(2-chloroethyl)amine, 2-ethylhexylamine, bis-(2-chloroethyl)amine, 2-ethylhexylamine, bis-(2-ethylhexyl)amine, N-methylstearylamine, dialkylamines, ethylenediamine, N,N'-dimethylethylenediamine, tetramethylethylenediamine, diethylenetriamine, permethyldiethylenetriamine, triethylenetetramine, tetraethylenepentamine, 1,2-diaminopropane, di-propylenetriamine, tripropylenetetramine, 1,4-diaminobutane, 1,6-diaminohexane, 4-amino-1-diethylaminopentane, 2,5-diamino-2,5-dimethylhexane, trimethylhexamethylenediamine, N,N-dimethylaminoethanol, 2-(2-diethylaminoethoxy)ethanol, bis-(2-hydroxyethyl)-oleylamine, tris-[2-(2-hydroxy-ethoxy)-ethyl]amine, 3-amino-1-propanol, methyl-(3-aminopropyl)ether, ethyl-(3-aminopropyl)ether, 1,4-butanediol-bis(3-aminopropylether), 3-dimethylamino-1-propanol, 1-amino-2-propanol, 1-diethylamino-2-propanol, diisopropanolamine, methyl-bis-(2-hydroxypropyl)amine, tris-(2-hydroxypropyl)amine, 4-amino-2-butanol, 2-amino-2-methylpropanol, 2-amino-2-methyl-propanediol, 2-amino-2-hydroxymethylpropanediol, 5-diethylamino-2-pentanone, 3-methylamino-propionic acid nitrile, 6-aminohexanoic acid, 11-aminoundecanoic acid, 6-aminohexanoic acid ethyl ester, 11-aminohexanoic acid isopropyl ester, cyclohexylamine, N-methylcyclohexylamine, N,N-dimethylcyclohexylamine, dicyclohexylamine, N-ethylcyclohexylamine, N-(2-hydroxyethyl)cyclohexylamine, N,N-bis-(2-hydroxyethyl)cyclohexylamine, N-(3-aminopropyl)cyclohexylamine, aminomethylcydohexane, hexahydrotoluidine, hexahydrobenzylamine, aniline, N-methylaniline, N,N-dimethylaniline, N,N-diethylaniline, N,N-dipropylaniline, isobutylaniline, toluidine, diphenylamine, hydroxyethylaniline, bis-(hydroxyethyl)aniline, chloroaniline, aminophenols, aminobenzoic acids and their esters, benzylamine, dibenzylamine, tribenzylamine, methyldibenzylamine, α-phenylethylamine, xylidine, diisopropylaniline, dodecylaniline, aminonaphthalene, N-methylaminonaphthalene, N,N-dimethylaminonaphthalene, N,N-dibenzylnaphthalene, diaminocyclohexane, 4,4'-diaminodicyclohexylmethane, diamino-dimethyl-dicyclohexylmethane, phenylenediamine, xylylenediamine, diaminobiphenyl, naphthalenediamines, toluidines, benzidines, 2,2-bis-(aminophenyl)propane, aminoanisoles, aminothiophenols, aminodiphenyl ether, aminocresols, morpholine, N-methylmorpholine, N-phenylmorpholine, hydroxyethylmorpholine, N-methylpyrrolidine, pyrrolidine, piperidine, hydroxyethylpiperidine, pyrroles, pyridines, quinolines, indoles, indolenines, carbazoles, pyrazoles, imidazoles, thiazoles, pyrimidines, quinoxalines, aminomorpholine, dimorpholinethane, [2,2,2]-diazabicyclooctane and N,N-dimethyl-p-toluidine.

Preferred amines are aniline derivatives and N,N-bisalkylarylamines, such as N,N-dimethylaniline, N,N-diethylaniline, N,N-dimethyl-p-toluidine, N,N-bis(hydroxyalkyl)arylamines, N,N-bis(2-hydroxyethyl)anilines, N,N-bis(2-hydroxyethyl)toluidine, N,N-bis(2-hydroxypropyl)aniline, N,N-bis(2-hydroxypropyl)toluidine, N,N-bis(3-methacryloyl-2-hydroxypropyl)-p-toluidine, N,N-dibutoxyhydroxypropyl-p-toluidine and 4,4'-bis(dimethylamino)diphenylmethane.

Polymeric amines, such as those obtained by polycondensation of N,N-bis(hydroxyalkyl)aniline with dicarboxylic acids or by polyaddition of ethylene oxide and these amines, are likewise suitable as accelerators.

Suitable metal salts are, for example, cobalt octoate or cobalt naphthenoate as well as vanadium, potassium, calcium, copper, manganese or zirconium carboxylates.

The resin mixture may further contain a co-accelerator, especially when a transition metal compound is used as accelerator. Depending on the selected transition metal compound, the person skilled in the art is in position to select a suitable co-accelerator in order to achieve the desired curing properties. If a cobalt compound is used as accelerator, the co-accelerator is preferably an amine and/or a 1,3-dioxo compound. If a copper compound is used as accelerator, the co-accelerator is preferably an amine, an acetoamide, a potassium salt, an imidazole and/or a gallate or mixtures thereof. If a manganese compound is used as accelerator, the co-accelerator is preferably a 1,3-dioxo compound, a thiol and/or a potassium or lithium salt or mixtures thereof. If an iron compound is used as accelerator, the co-accelerator is preferably a 1,3-dioxo compound and/or a thiol, preferably in combination with an alkali metal salt. Suitable 1,3-dioxo compounds are acetylacetone, acetoacetates and acetoacetamides.

The accelerators and/or co-accelerators are preferably contained in a proportion of 0 to 3 percent by weight, preferably 0.01 to 2 wt %, in the mortar compound.

Furthermore, the resin component (A) may contain one or more of the customary polymerization inhibitors for stabilization of the resin mixtures against premature polymerization and for adjustment of the gel time, preferably in a proportion of 0 to 0.5 percent by weight relative to the total weight of the mortar compound. The polymerization inhibitors, such as known to the person skilled in the art, usually used for free-radical-polymerizable compounds, are suitable as polymerization inhibitors.

Preferably, the mortar compound, especially the resin component (A), comprises at least one polymerization inhibitor from the group of phenolic compounds as well as optionally non-phenolic compounds, such as stable free radicals and/or phenothiazines.

Phenols, such as 2-methoxyphenol, 4-methoxyphenol, 2,6-di-tert-butyl-4-methylphenol, 2,4-di-tert-butylphenol, 2,6-di-tert-butylphenol, 2,4,6-trimethylphenol, 2,4,6-tris(dimethylaminomethyl)phenol, 4,4'-thio-bis(3-methyl-6-tert-butylphenol), 4,4'-isopropylidenediphenol, 6,6'-di-tert-butyl-4,4'-bis(2,6-di-tert-butylphenol), 1,3,5-trimethyl-2,4,6-tris(3,5-di-tert-butyl-4-hydroxybenzyl)benzene, 2,2'-methylene-di-p-cresol, pyrocatechol and butyl pyrocatechols, such as 4-tert-butyl pyrocatechol, 4,6-di-tert-butyl pyrocatechol, hydroquinones, such as hydroquinone, 2-methylhydroquinone, 2-tert-butylhydroquinone, 2,5-di-tert-butylhydroquinone, 2,6-di-tert-butylhydroquinone, 2,6-dimethylhydroquinone, 2,3,5-trimethylhydroquinone, benzoquinone, 2,3,5,6-tetrachloro-1,4-benzoquinone, methylbenzoquinone, 2,6-dimethylbenzoquinone, naphthoquinone, or mixtures of two or more thereof, may be regarded as phenolic polymerization inhibitors, which are often ingredients of commercial free-radical-curing reactive resins.

Phenothiazines, such as phenothiazine and/or derivatives or combinations thereof, or stable organic free radical, such as galvinoxyl and N-oxyl free radicals, may be preferably regarded as non-phenolic polymerization inhibitors.

Suitable stable N-oxyl free radicals (nitroxyl free radicals) may be selected from among 1-oxyl-2,2,6,6-tetramethylpiperidine, 1-oxyl-2,2,6,6-tetramethylpiperidine-4-ol (also known as TEMPOL), 1-oxyl-2,2,6,6-tetramethylpiperidine-4-one (also known as TEMPON), 1-oxyl-2,2,6,6-tetramethyl-4-carboxyl-piperidine (also known as 4-carboxy-TEMPO), 1-oxyl-2,2,5,5-tetramethylpyrrolidine, 1-oxyl-2,2,5,5-tetramethyl-3-carboxylpyrrolidine (also known as 3-carboxy-PROXYL), aluminum-N-nitrosophenylhydroxylamine, diethylhydroxylamine, as described in DE199 56 509. Furthermore, suitable N-oxyl compounds are oximes, such as acetaldoxime, acetone oxime, methyl ethyl ketone oxime, salicylaldoxime, benzoxime, glyoximes, dimethylglyoxime, acetone-O-(benzyloxycarbonyl)oxime and the like. Furthermore, pyrimidinol or pyridinol compounds substituted in para position relative to the hydroxyl group may be used as polymerization inhibitors, as described in DE 10 2011 077 248 B1.

Depending on the desired properties and the use of the resin mixture, the polymerization inhibitors may be used either alone or as a combination of two or more thereof.

According to a particular embodiment, the mortar compound comprises a phenolic polymerization inhibitor, which is able to bind to the transition alumina and thus favor a reduction of the polymerization shrinkage by an interaction with the transition aluminas contained in the mortar compound.

The ability of the phenolic compound to bind to the transition alumina may be determined by an HPLC investigation. For this purpose, the phenolic compound is dissolved in 1,4-butanediol dimethacrylate (BDDMA), with formation of a 0.5% solution (w/w). Part of this solution is used as reference sample for the HPLC measurement. 6 g of the alumina to be investigated is added to 25 g of the solution, mixed in the Speedmixer and left to stand for 1 hour. Then approximately equal quantities of the supernatant and of the reference sample are taken up in approximately 1 mL acetonitrile and separated on an HPLC column (Reprosil-Pur™ C-18 AQ, 5 µm), using water/acetonitrile as eluent. The chromatograms obtained in this way are normalized relative to the BDDMA peak. The phenolic compound is capable of binding to the transition alumina when the maximum peak height of the phenolic compound in the chromatogram of the investigated sample is at most 20%, preferably at most 10% of the maximum peak height in the reference sample.

Preferred phenolic polymerization inhibitors capable of binding to transition aluminas are in particular sterically unhindered phenols having two or more hydroxy groups, particularly preferably hydroquinone, substituted hydroquinones, e.g. 4-methoxyphenol, benzoquinone and pyrocatechol as well as derivatives thereof, such as tert-butyl pyrocatechol, 4-methyl pyrocatechol, 3,5-di-tert-butyl pyrocatechol and 3,4-dihydroxybenzaldehyde.

Quite particularly preferably, the aforesaid phenolic polymerization inhibitors are used together with nitroxyl compounds, especially with stable nitroxyl free radicals, also known as N-oxyl free radicals, for stabilization of the mortar compound. N-Oxyl free radicals such as piperidinyl-N-oxyl or tetrahydropyrrole-N-oxyl, as described in DE 19531649 A1, are preferred.

Particularly preferably, 4-hydroxy-2,2,6,6-tetramethylpiperidine-N-oxyl (referred to as Tempol hereinafter) is used as additional polymerization inhibitor for stabilization of the mortar compound.

Finally, the mortar compound may contain still further organic additives, such as primers on the basis of silane compounds, as known to the person skilled in the art from, for example, EP 2 371 782 A2 and WO 2011/072789 A1.

The hardening agent, contained in the hardener component (B) of the inventive two-component mortar compound, for the free-radical-polymerizable resin of the resin component (A), preferably comprises at least one organic peroxide, for example dibenzoyl peroxide, methyl ethyl ketone peroxide, tert-butyl perbenzoate, cyclohexanone peroxide, lauryl peroxide, cumene hydroperoxide and/or tert.-butylperoxy-2-ethylhexanoate.

The organic peroxides are preferably phlegmatized, especially by addition of water as phlegmatization agent and/or solvent. Suitable hardener components are known to the person skilled in the art and are available on the market.

For adjustment of a suitable viscosity, the hardener component (B) may contain a proportion of further inorganic fillers and modifiers, such as thixotropic agents.

According to the invention, it is preferable to use an anhydrous hardener component, in which the hardening agents are phlegmatized by inert fillers. Such hardener components are available, for example, under the trade name Perkadox™ of Akzo Nobel. The use of an anhydrous hardener component contributes to further enhancement of the synergistic interaction between the use of the transition aluminas and pyrocatechol or pyrocatechol derivatives as polymerization inhibitors, so that the polymerization shrinkage of the mortar compound can already be further reduced with small proportions of transition aluminas.

The inventive two-component mortar compound is preferably kept in casings, cartridges or foil bags, which are labeled to show that they comprise two or more chambers separated from one another, in which the resin component (A) and the hardener component (B) of the mortar compound are disposed separated from one another in order to inhibit reaction.

The resin component (A) of the inventive two-component mortar compound may preferably have the following composition:

a free-radical-curing resin in a proportion of 5 to 45 wt %;
a reactive diluent in a proportion of 0 to 25 wt %;
an accelerator in a proportion of 0 to 3 wt %;
a polymerization inhibitor in a proportion of 0 to 5 wt %; and
at least one inorganic additive in a proportion of 50 to 80 wt %;
wherein the sum of all proportions adds up to 100 percent by weight, and wherein the inorganic additive comprises at least one transition alumina having a mean particle size d50 of at least 7 µm.

The transition alumina preferably has a mean particle size of at least 12 µm, further preferably of at least 14 µm or at least 25 µm, and particularly preferably of at least 35 µm, wherein the upper limit of the mean particle size may preferably be up to 120 µm.

According to the invention, the mean pore diameter of the transition alumina lies in a range of 4 nm to 30 nm, preferably of 4.5 nm to 20 nm, particularly preferably of 4.5 nm to 15 nm.

The proportion of the transition alumina in the resin component (A) lies preferably in a range 0.5 to 20 percent by weight, preferably of 1 to 10 percent by weight.

The hardener component (B) preferably comprises the hardening agent in a proportion of 10 to 25 percent by weight, fillers and modifiers in a proportion of 45 to 90 percent by weight and water in a proportion of 0 to 30 percent by weight.

For application of the mortar compound, the resin component (A) and the hardener component (B) are mixed with one another, wherein the weight ratio of the resin component (A) to the hardener component (B) is chosen such that the resin component cures reliably after being mixed with the hardener component. Via the proportion of polymerization inhibitors in the resin component (A) and the phlegmatization agent in the hardener component (B), the gel time of the mixture and thus the time available for processing of the mixed compound can be adjusted. Preferably, the weight ratio of the resin component (A) to the hardener component (B) lies in a range of 4:1 to 7:1 and the weight ratio of free-radical-curing resin together with reactive diluent to hardening agent lies lie in a range of 10:1 to 15:1.

The inventive two-component mortar compounds may advantageously have the following total composition of resin component (A) and hardener component (B):

free-radical-curing resin in a proportion of 5 to 50 wt %;
reactive diluent in a proportion of 0 to 25 wt %;
organic peroxide in a proportion of 0.5 to 5 wt %,
polymerization accelerator in a proportion of 0 to 0.5 wt %;
at least one transition alumina in a proportion of 2 to 20 percent by weight;

further inorganic additives in a proportion of 10 to 78 wt %; and water in a proportion of 0 to 10 wt %.

The sum of all proportions of the compound adds up to 100 percent by weight.

According to the invention, the transition alumina has a mean particle size d50 of at least 7 μm, preferably of at least 12 μm, further preferably of at least 14 μm or at least 25 μm, and particularly preferably of at least 35 μm. According to the invention, the mean pore diameter of the transition alumina lies in a range of 4 nm to 30 nm, preferably of 4.5 nm to 20 nm, particularly preferably of 4.5 nm to 15 nm.

The proportion of the transition alumina in the mortar compound lies preferably in a range 0.5 to 15 percent by weight, preferably of 1 to 10 percent by weight.

For application as intended, the resin component (A) and the hardener component (B) are emptied out of the separate chambers and mixed in a suitable apparatus, for example a static mixer, a Speedmixer or a dissolver. The mixture of resin component (A) and hardener component (B) is then introduced by means of a known injection apparatus into the previously cleaned drilled hole. Then the structural part to be fixed is inserted into the mortar compound and adjusted. The hardening agent of the hardener component (B) initiates the free-radical polymerization of the resin component (A), so that the mortar compound cures within a few hours under environmental conditions.

Subject matter of the invention is therefore also the use of the inventive two-component mortar compound for chemical fastening of structural parts, especially threaded anchor rods, rebars, threaded sleeves and screws in drilled holes, which are present in a mineral substrate, preferably concrete.

Further advantages of the invention will become obvious from the following description of preferred embodiments with reference to the attached drawings. In the drawings:

FIG. 2 shows a diagram illustrating the bond strength, determined in a steel-sleeve test, of mortar compounds as a function of the undercut depth of the steel sleeve.

INVESTIGATION OF THE ALUMINAS USED

Crystal Phase

Figure 1:
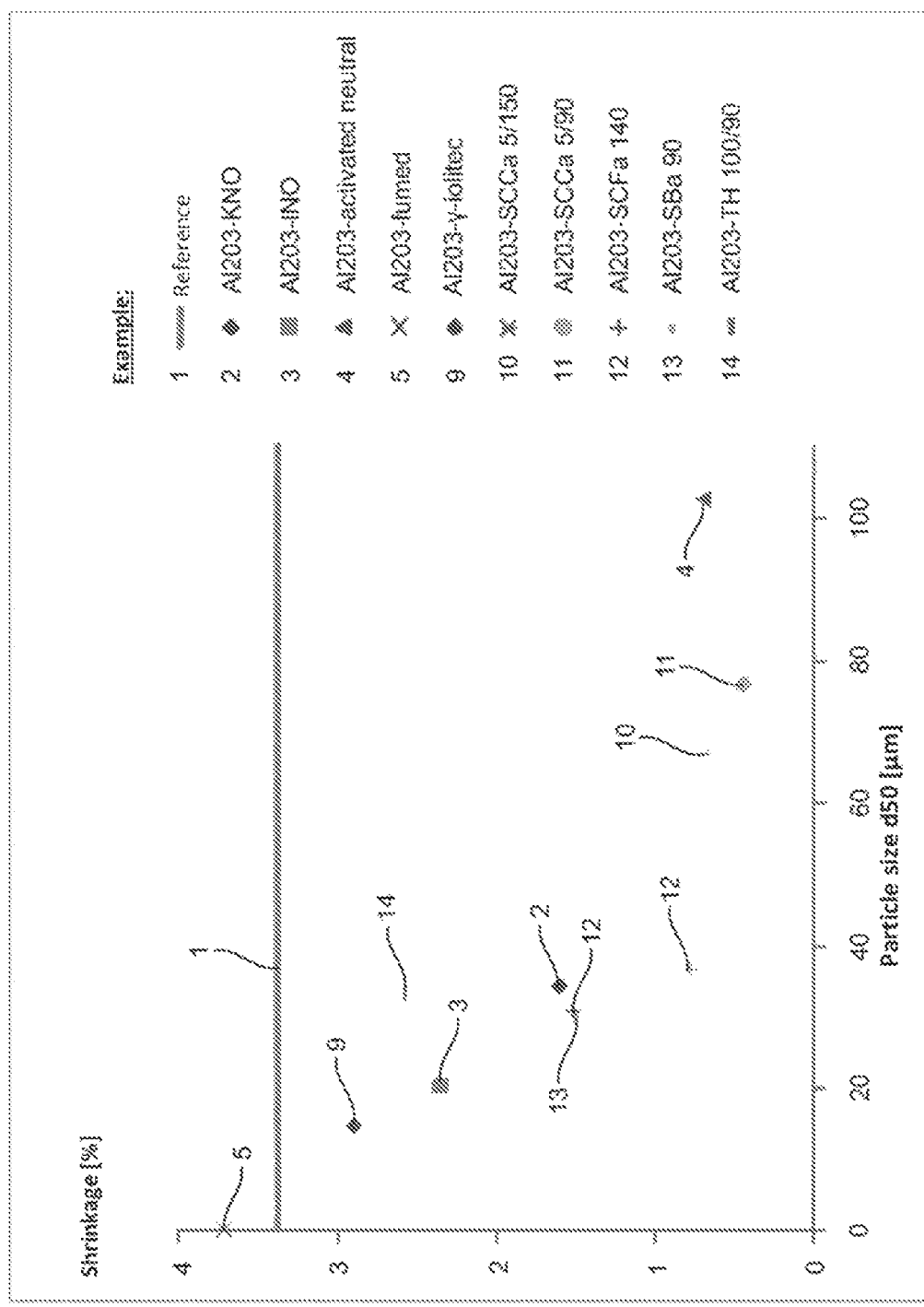
FIG. 1 shows a diagram illustrating the polymerization shrinkage as a function of the mean particle size of the transition aluminas.

The crystal phase of the aluminas used was determined by X-ray diffraction. The X-rays were generated with a Cu X-ray tube. The structure model needed for qualitative and quantitative analysis of the crystal phases was taken from the PDF file (Powder Diffraction File) and the ICSD file (Inorganic Crystal Structure Database).

Particle Size

The particle-size analysis was carried out with the LS 13320 instrument of Beckman Coulter, using laser diffractometry. The detectable particle-size range of the measuring instrument used was 0.017 μm to 2000 μm. For the measurements, the samples were slurried with demineralized water and treated ultrasonically for 30 seconds. Part of the suspension was then introduced into the measuring cell of the instrument. The d5, d50 and d95 values were determined on the basis of the volume distribution. The d50 value used for the evaluation represents the median of a distribution. This means that 50 vol % of the particles in the sample are smaller than the particle size corresponding to the d50 value.

Specific Surface and Pore Analysis

The BET specific surface and the pore sizes of the investigated samples were determined with the NOVA-touch® LX4 instrument of the Quantachrome Co. Nitrogen was used as the measuring gas for determination of the sorption isotherms. The pore-size distribution was determined according to the method of Barret, Joyner and Halenda (BJH method). According to this, the pore-size distribution of the samples can be calculated from the desorption branch of the isotherms. The most frequent pore diameter of the desorption branch of the sample was defined as the characteristic value of the distribution. Thus "pore diameter" is understood to be the most frequent pore diameter of the sample.

Investigations of the Mortar Compound

Polymerization Shrinkage

The shrinkage behavior of the mortar compounds is determined by measurement of the linear thickness change of a mortar bed by means of a laser beam during curing. To perform the measurement, 2.5 g of mortar compound mixed for 10 seconds at 1000 rpm in a Speedmixer is applied with a spatula onto a steel plate, which is bounded on the left and right by spacers having a height of 2.5 mm. A steel plate having a thickness of 0.5 mm is placed as a reflector on the mortar. Using a further steel plate, the mortar together with the reflector plate is pressed flat to a height of 2.5 mm. The thickness of the mortar bed is therefore exactly 2 mm. For the measurement, the upper steel plate is removed again and the thickness change of the mortar bed during and after curing is determined by reflection of a laser beam on the reflector plate. At least 5 measurements are made and a mean value is calculated. The polymerization shrinkage indicates the percentage change of thickness of the cured mortar bed relative to the thickness of the mortar bed prior to curing.

The values determined for the polymerization shrinkage are evaluated relative to the reduction of shrinkage achieved in comparison with a mortar compound without transition aluminas and are subdivided into the following groups Very pronounced: Polymerization shrinkage <1.0%
Pronounced: Polymerization shrinkage 1.0% to 2.3%
Slight: Polymerization shrinkage 2.3% to 3.1%
No: Polymerization shrinkage >3.1%

Polymerization Kinetics

To determine the enthalpy and rate of the polymerization reaction, DSC measurements were made with Mettler-Toledo measuring instruments. For the DSC measurements, approximately 100 mg mortar compound was introduced into a corundum crucible and the polymerization reaction was followed isothermally at 21° C. A corundum crucible was likewise used as reference crucible. Due to the exothermic reaction, a distinct peak, from which the enthalpy per gram of mortar compound used was determined, was visible in the DSC curve. In addition, the rate of the reaction was determined on the basis of the slope of the conversion curve of the reaction at the inflection point.

Bond Strength

For determination of the bond strength achieved with two-component mortar compounds, the mixed mortar is introduced into a steel sleeve having defined geometry and defined fill height of the mortar (bonding depth). Then, using a centering aid, an anchor rod is placed centrally in the steel sleeve filled with mortar. After curing of the mortar at room temperature and for at least 12 hours, the sample is screwed by means of a threaded adapter into a tension testing machine (type: Zwick Roell Z050, 50 kN). The sample is tested to failure with tensile force at defined speed. The corresponding force-displacement dependence is recorded continuously. Respectively five individual measurements are made and the mean value of the maximum force at failure is calculated.

The measurements were performed using anchor rods having M8 thread as well as steel sleeves having the following geometry:
Undercut depth: 0.35+/−0.02 mm
Undercut width: 3 mm
Bonding depth: 36 mm
Inside diameter 14 mm The bond strength determined from these measurements is defined at the ratio of maximum force at failure to sheared area of the anchor rod used (M8 anchor rod: 904.3 mm$^2$).

EXEMPLARY EMBODIMENTS

The invention will be described hereinafter on the basis of preferred exemplary embodiments, but these are in no way to be understood as limitative.

Two-Component Mortar Compound Based on a Urethane Methacrylate Resin

Example 1 (Comparison)

The resin component (A) of a two-component mortar compound is first prepared by homogenizing, to a pasty mass free of air bubbles, in the dissolver under vacuum, 34.5 g of an acrylate resin mixture with 44.2 g of a quartz sand, 18.5 g of an aluminate cement and 2.8 g of a hydrophobic fumed silica as thixotropic agent. The composition of the acrylate resin mixture is indicated in the following Table 1. The resin component (A) obtained in this way is introduced into a cartridge.

TABLE 1

Composition of the acrylate resin mixture

|  | Percent by mass |
|---|---|
| Urethane methacrylate and reactive diluent | 97.31 |
| Accelerator | 2.30 |
| Pyrocatechol | 0.27 |
| 4-tert-Butylpyrocatechol | 0.09 |
| Tempol | 0.03 |

An aqueous benzoyl peroxide suspension having a solids content of 35 percent by weight, containing 64 wt % filler in the form of quartz flour, 1 wt % of fumed silica and 35 wt % of benzoyl peroxide, is used as hardener component (B) of the two-component mortar compound. Thus the proportion of benzoyl peroxide in the hardener component (B) is 12.25 wt % and the water proportion is 22.75 wt % relative to the weight of the hardener component (B). The hardener component (B) is filled into a second cartridge.

For application as a chemical mortar compound for fastening of structural parts, the resin component (A) and the hardener component (B) are squeezed out of the cartridges and passed through a static mixer or mixed in a dissolver, whereby the reaction of these components begins, with curing of the reactive resin and optionally hardening of the cement. The reacting compound is injected into the drilled hole, whereupon the structural part to be fastened is introduced and adjusted.

The weight ratio of the resin component (A) to the hardener component (B) is 4.8:1, wherein the ratio of urethane methacrylate together with reactive diluent to benzoyl peroxide is adjusted to 13.5:1. This ratio of free-radical-curing components to hardening agent is the same is all exemplary embodiments.

The mortar compound according to Example 1 has a polymerization shrinkage of approximately 3.4%.

Examples 2 to 14

In the same way as indicated in Example 1, mortar compounds were produced in which respectively 5 percent by volume of the aluminate cement was replaced by an alumina. Thus the volume of the resin compound remained constant. The calculations of the formulation were based on an alumina density of 4 g/cm$^3$. All aluminas used are commercial products.

The polymerization shrinkage was determined for the mortar compounds obtained by mixing the resin component (A) and the hardener component (B). For some mortar compounds, the gel time was shortened so much by the addition of the transition aluminas that no shrinkage measurement was possible. In these cases, the gel time was prolonged by addition of a larger proportion of polymerization inhibitors.

The crystal phase and the source of supply of the aluminas used as well as the reduction of shrinkage using the mortar compounds produced with the aluminas are presented in the following Table 2.

TABLE 2

Aluminas

| Example | Alumina | Crystal phase | Supplier | Shrinkage reduction |
|---|---|---|---|---|
| 2 | Al$_2$O$_3$-KNO | θ/η | iolitec nanomaterials | pronounced |
| 3 | Al$_2$O$_3$-INO | θ/η | iolitec nanomaterials | slight |
| 4 | Al$_2$O$_3$ activated neutral | θ/γ | Sigma Aldrich | very pronounced |
| 5** | Al$_2$O$_3$-fumed*** | δ/η | Cabot | no |
| 6** | Al$_2$O$_3$-calcined | α | Sigma Aldrich | slight |
| 7** | Al$_2$O$_3$-fused | α | Sigma Aldrich | no |
| 8** | Al$_2$O$_3$-Chempur | α | Chempur | no |
| 9 | Al$_2$O$_3$-γ-iolitec | γ* | iolitec nanomaterials | slight |
| 10 | Al$_2$O$_3$-SCCa 5/150 | γ* | Sasol | very pronounced |
| 11 | Al$_2$O$_3$-SCCa 5/90 | δ* | Sasol | very pronounced |
| 12 | Al$_2$O$_3$-SCFa 140 | γ/δ* | Sasol | pronounced |
| 13 | Al$_2$O$_3$-SBa 90 | δ/θ* | Sasol | pronounced |
| 14 | Al$_2$O$_3$-TH 100/90 | θ/η* | Sasol | slight |

*Crystal phase according to manufacturer's statements
**Comparison examples
***Only 2.3 percent by volume When alumina Al$_2$O$_3$ fumed was used, it was only possible, due to the intensive thickening effect, to introduce approximately 2.3 percent by volume into the mortar compound.

From the examples of Table 2, it may be inferred that the polymerization shrinkage is significantly influenced by the type of alumina used. All aluminas having a polymerization-shrinkage-reducing effect are transition aluminas. The aluminas can be subdivided into four groups in terms of shrinkage reduction. The first group consists of three transition aluminas (Al$_2$O$_3$ activated neutral, Al$_2$O$_3$—SCCa 5/150 and Al$_2$O$_3$—SCCa 5/90), which significantly reduce the polymerization shrinkage to less than 1%. The next group contains three transition aluminas (Al$_2$O$_3$—KNO, Al$_2$O$_3$—SCFa 140 und Al$_2$O$_3$—SBa 90), which reduce the shrinkage to approximately 1.3% to 1.6%. This is followed by four aluminas having a polymerization shrinkage of approximately 2.3 to 2.7%. The aluminas of the fourth group have no influence on the polymerization shrinkage compared with the compound according to Example 1.

The exemplary embodiments show further that the reduction of the polymerization shrinkage is also influenced by the particle size of the alumina. The particle-size distribution of the transition aluminas used in indicated in Table 3.

TABLE 3

Particle size distribution

| Example | Alumina | Shrinkage reduction | d5 [μm] | d50 [μm] | d95 [μm] | d5/d95 |
|---|---|---|---|---|---|---|
| 2 | Al₂O₃-KNO | pronounced | 4.5 ± 0.0 | 34.3 ± 0.1 | 93.2 ± 0.33 | 0.05 ± 0.00 |
| 3 | Al₂O₃-INO | slight | 2.4 ± 0 | 20.3 ± 1.8 | 78.1 ± 7.6 | 0.03 ± 0.00 |
| 4 | Al₂O₃ activated neutral | very pronounced | 48.3 ± 1.0 | 102.5 ± 0.5 | 158.8 ± 0.7 | 0.30 ± 0.00 |
| 5** | Al₂O₃-fumed*** | no | 0.1 ± 0.0 | 0.16 ± 0.0 | 0.43 ± 0.1 | 0.26 ± 0.07 |
| 6** | Al₂O₃-calcined | slight | 16.7 ± 2.0 | 73.5 ± 2.3 | 130.5 ± 1.6 | 0.13 ± 0.01 |
| 7** | Al₂O₃-fused | no | 13.9 ± 0.0 | 31.0 ± 0.1 | 68.5 ± 0.3 | 0.20 ± 0.00 |
| 8** | Al₂O₃-Chempur | no | 0.3 ± 0.0 | 2.6 ± 0.8 | 28.7 ± 11.3 | 0.01 ± 0.00 |
| 9 | Al₂O₃-γ-iolitec | slight | 0.5 ± 0.5 | 14.8 ± 8.3 | 56.1 ± 20.4 | 0.01 ± 0.01 |
| 10 | Al₂O₃-SCCa 5/150 | very pronounced | 10.6 ± 1.8 | 66.8 ± 1.3 | 114.3 ± 1.0 | 0.09 ± 0.02 |
| 11 | Al₂O₃-SCCa 5/90 | very pronounced | 34.7 ± 13.7 | 76.5 ± 6.1 | 134.7 ± 3.4 | 0.25 ± 0.10 |
| 12 | Al₂O₃-SCFa 140 | pronounced | 2.9 ± 0.1 | 30.6 ± 1.5 | 99.3 ± 5.4 | 0.03 ± 0.00 |
| 13 | Al₂O₃-SBa 90 | pronounced | 3.3 ± 0.4 | 29.5 ± 3.3 | 84.9 ± 3.4 | 0.04 ± 0.00 |
| 14 | Al₂O₃-TH 100/90 | slight | 3.5 ± 0.1 | 33.5 ± 0.1 | 93.6 ± 0.5 | 0.04 ± 0.00 |

**Comparison examples

In FIG. 1, the mean particle size of the transition aluminas is plotted against the polymerization shrinkage. From this diagram, it can be seen that a pronounced reduction of polymerization shrinkage occurs starting from a mean particle size of approximately 25 μm, while a slight reduction of shrinkage can be achieved starting from a mean particle size of approximately 14 μm.

α-Aluminas do not exhibit any pronounced shrinkage reduction even at a larger mean particle size. A mortar compound produced according to Example 4 using the transition alumina Al₂O₃ activated neutral, which was ground for approximately 15 minutes in a ball mill, still exhibits only a slight shrinkage reduction of 3% at a mean particle size d50 of 7.1 μm. For a grinding time of only 5 minutes and a resulting mean particle size of approximately 12.0 μm for the Al₂O₃ activated neutral, an improvement of the shrinkage reduction to approximately 2.6% was observed. An Al₂O activated neutral obtained by shortening the grinding time to 3 minutes and having a mean particle diameter of approximately 20 μm yields mortar compounds having a polymerization shrinkage of approximately 1.8%. These measurements likewise show that the polymerization shrinkage of the mortar compounds is decisively influenced by the particle size of the transition alumina used.

From BET measurement of the transition aluminas, no relationship between the specific surface (BET) and the polymerization shrinkage can be discerned. However, the pore diameter of 27.0 nm determined for the transition alumina TH100/90 suggests that the polymerization shrinkage of the mortar compound will increase if the the pores in the transition alumina used are too large. A preferred pore diameter of the transition aluminas therefore lies in a range of approximately 5 to 15 nm.

The use of porous silica gels in mortar compounds according to Example 1 having a mean particle size d50 of 11 to 130 μm and pore diameters in a range of 3 to 15 nm, in a proportion of 5 percent by volume, surprisingly does not lead to any reduction of the polymerization shrinkage.

Examples 15 to 19

In the same way as indicated in Example 1, mortar compounds were produced in which different proportions by volume of the aluminate cement in the resin component (A) were replaced by corresponding proportion of the transition alumina Al₂O₃—KNO. Thus the volume of the resin compound remained constant. The polymerization shrinkage was determined for the mortar compounds obtained by mixing the resin component (A) with the hardener component (B) in the Speedmixer. The results obtained are presented in the following Table 4.

TABLE 4

| Example | Proportion by volume Al2O3-KNO [%] | Polymerization shrinkage [%] |
|---|---|---|
| 15 | 0.5 | 3.1 |
| 16 | 1 | 2.4 |
| 17 | 3 | 1.7 |
| 18 | 5 | 1.3 |
| 19 | 8 | 1.5 |

The results presented in Table 4 show that a pronounced reduction of the polymerization shrinkage takes place starting from a proportion of approximately 1 percent by volume of the transition alumina in the mortar compound. At higher proportions by volume, starting from approximately 10%, it was then possible to process the investigated compound only with difficulty.

From DSC measurements on the mortar compound according to Example 16, it is evident that neither the reaction enthalpy nor the rate of curing is influenced by the addition of the transition aluminas. Merely a shortening of the gel time can be observed, and it can be compensated for by addition of further polymerization inhibitors. The pH of the transition alumina used likewise has no influence on the shrinkage reduction.

Examples 20 to 24

Mortar compounds having different polymerization inhibitors were produced in the same way as indicated in Example 1. The composition of the resin component (A) of the respective produced mortar compounds is indicated in the following Table 5. The proportion of $Al_2O_3$ activated neutral in Examples 21 to 24 corresponds to 1 percent by volume of the mortar compound.

In Table 5,

Tempol: means 4-hydroxy-2,2-6,6-tetramethylpiperidine-1-oxyl

BHT means tert.-butylhydroxytoluene

BK: means pyrocatechol tBBK: means 4-tert-butylpyrocatechol

TABLE 5

Composition of the resin component (A)

| Component | Example 20 (comparison) [wt %] | Example 21 [wt %] | Example 22 [wt %] | Example 23 [wt %] | Example 24 [wt %] |
|---|---|---|---|---|---|
| Urethane methacrylate resin and reactive diluent | 33.6 | 33.5 | 33.5 | 33.5 | 33.5 |
| Accelerator | 0.8 | 0.8 | 0.79 | 0.79 | 0.79 |
| Quartz flour | 44.2 | 44.2 | 44.2 | 44.2 | 44.2 |
| Aluminate cement | 18.4 | 16.6 | 16.6 | 16.7 | 16.7 |
| Fumed silica | 2.8 | 2.5 | 2.5 | 2.5 | 2.5 |
| $Al_2O_3$ activated neutral | 0 | 2.2 | 2.2 | 2.2 | 2.2 |
| Tempol | 0.2 | 0.2 | 0.01 | 0.01 | 0.01 |
| BHT | | | 0.2 | | |
| BK | | | | 0.1 | |
| tBBK | | | | | 0.1 |
| Total | 100 | 100 | 100 | 100 | 100 |
| Shrinkage reduction | no | slight | no | pronounced | pronounced |

The examples show that mortar compounds containing sterically unhindered phenols such as pyrocatechol or tBBK achieve a very pronounced shrinkage reduction. Similar results were obtained with other dihydric phenols, such as hydroquinone, 3,4-dihydroxybenzaldehyde, 3,5-di-tert.-butylpyrocatechol and 4-methylpyrocatechol. In the absence of phenolic polymerization inhibitors and/or during use of sterically hindered phenols such as BHT, however, no substantial shrinkage reduction was measured. This result can be attributed to the observation that phenolic polymerization inhibitors, especially such having two and more hydroxyl groups, have a strong interaction with transition aluminas, thus suggesting covalent binding of the phenolic hydroxyl groups to the surface of the aluminas. In contrast, sterically hindered phenols such as BHT are unable to bind to the transition alumina.

Example 25

For production of a two-component mortar compound containing anhydrous hardener component, the resin component (A) was first prepared with the composition indicated in the following Table 6. The mixture was homogenized to a pasty mass free of air bubbles under vacuum in the dissolver. The resin component (A) obtained in this way was introduced into a cartridge.

TABLE 6

| Resin component (A) | Proportions in compound [wt %] |
|---|---|
| Methacrylate resin and reactive diluent | 34.5 |
| 4-tert-Butylpyrocatechol | 0.035 |
| Quartz sand | 44.2 |
| High-alumina cement | 16.55 |
| Fumed silica 1 | 0.9 |
| Fumed silica 2 | 1.6 |
| $Al_2O_3$-activated neutral | 2.22 |

An anhydrous benzoyl peroxide mixture commercially available under the trade name Perkadox™ and phlegmatized by inert fillers was used as hardener component (B). Dibenzoyl peroxide in a proportion of 19 to 22 percent by weight and fillers in a proportion of 78 to 81 percent by weight were contained in this hardener component. The hardener component (B) was filled into a second cartridge.

Then the resin component (A) and the hardener component (B) were mixed in the Speedmixer and the polymerization shrinkage was determined. The weight ratio of the free-radical-curing component (methacrylate resin together with reactive diluent) to the hardening agent in the hardener component (B) was 13.5:1.

The mortar compound according to Example 25 has a polymerization shrinkage of 1.6%. This proves that water in the hardener component (B) is not needed for shrinkage reduction and that, when an anhydrous hardener component is used, small quantities of transition aluminas are already sufficient to achieve a pronounced shrinkage reduction.

Example 26

For production of a two-component mortar compound containing transition alumina introduced into the water-containing hardener component (B), the resin component (A) indicated in Example 1 was mixed in the Speedmixer with the hardener component (B) indicated in the following Table 7, and the polymerization shrinkage was measured. The quantity of transition alumina introduced into the mortar compound corresponds to 1 percent by volume.

TABLE 7

Hardener component (B)

| | Proportions in compound [wt %] |
|---|---|
| Dibenzoyl peroxide | 12.25 |
| Water | 22.75 |
| Fillers | 53 |
| Fumed silica | 1 |
| Al$_2$O$_3$-activated neutral | 11 |

The mortar compound according to Example 26 does not exhibit any reduction of the polymerization shrinkage compared with Comparison Example 1. Without intending to adhere to a theory, it may be assumed that the transition alumina in the hardener component (B) is deactivated by the contact with water lasting for a longer time period and/or that an interaction with the phenolic polymerization inhibitors is prevented.

Example 27

Determination of the Bond Strength

The bond strengths obtained using the mortar compounds having resin compositions according to Examples 1 as well as 16 to 18 are compiled in the following Table 8:

TABLE 8

Bond strength of the mortar compounds

| | Polymerization shrinkage [%] | Bond strength [N/mm$^2$] |
|---|---|---|
| Example 1 | 3.4 | 23.6 |
| Example 16 | 2.4 | 25.0 |
| Example 17 | 1.8 | 29.9 |
| Example 18 | 1.3 | 31.8 |

As can be seen from the results presented in Table 8, the inventive two component mortar compound does not exhibit any deterioration, compared with the compound according to Comparison Example 1, of the load ratings for the adhesion of anchor rods in the steel-sleeve test.

The measurements described hereinabove were repeated with modified steel sleeves, wherein the undercut depth of the steel sleeves were varied between 25 µm and 350 µm for an undercut width of 3 mm.

FIG. 2 illustrates the dependence of the bond strength on the undercut depth of the anchor rods for the reference compound according to Example 1 and the two-component mortar compounds according to Examples 16, 17 and 18. It will be seen that the mortar compound according to Example 18—by virtue of the smaller shrinkage for all tested undercut depths—yields a substantially constant bond strength, whereas the reference compound according to Example 1, which has a smoother surface with smaller undercut depth, fails more easily and has adequate pull-out strength only for rough surfaces with undercut depths starting from 200 µm. At the same time, it can be shown that the performance of the bonded anchor is better the smaller the polymerization shrinkage of the mortar compound is. The dependence of the bond strength achieved with the mortar compounds on the undercut depth of the steel sleeves is much stronger for mortar compounds having high polymerization shrinkage than for mortar compounds having low polymerization shrinkage.

Example 28

Load Ratings of Mortar Compounds in Oversized Drilled Holes

For determination of the load ratings achieved with two-component mortar compounds, high-strength M12 or M24 threaded anchor rods are used in the form of dowels held by the respective two-component mortar compound in a drilled hole having a specified diameter and a drilled-hole depth of 72 mm. The mortar compounds according to Example 1 having a polymerization shrinkage of 3.4% and according to Example 17 having a polymerization shrinkage of 1.8% were used for this test. The drilled holes were drilled wet using a diamond drill and cleaned using compressed air (6 bar), brushed and then blown out again with compressed air. After a curing time of 24 hours at room temperature, the mean failure load is measured by pulling the threaded anchor rod out centrally against closely positioned bracing means, and the mean failure load of three anchors is determined.

The tests were repeated on oversized drilled holes having a diameter of 1.5 times that of the respected threaded anchor rods under otherwise identical conditions.

The values determined in this way for the mean failure load are presented in the following Table 9.

TABLE 9

Load ratings

| Mortar compound | Threaded rod diameter [mm] | Drilled hole diameter [mm] | Failure load [N/mm$^2$] | Change [%] |
|---|---|---|---|---|
| Example 1 | 12 | 14 | 23.8 | |
| Example 1 | 12 | 18 | 17.6 | −26.4% |
| Example 17 | 12 | 14 | 25.0 | |
| Example 17 | 12 | 18 | 22.3 | −10.8% |
| Example 1 | 24 | 28 | 12.4 | |
| Example 1 | 24 | 35 | 8.4 | −32.2% |
| Example 17 | 24 | 28 | 22.2 | |
| Example 17 | 24 | 35 | 25.6 | +13.5% |

Compared with the mortar compound according to Example 1, it is not only the mean failure load in drilled holes drilled under wet conditions that can be significantly improved by the addition of transition alumina to the resin component (A). It can also be shown that the mean failure load decreases less rapidly in oversized drilled holes and that the inventive compounds are therefore more stable relative to external influences.

The invention claimed is:

1. A two-component mortar compound, comprising:
a resin component (A), which, as the curable ingredient, contains at least a free-radical-curing resin, and
a hardener component (B), which contains a hardening agent for the free-radical-curing resin of the resin component (A),
wherein the resin component (A) and/or the hardener component (B) contains at least one inorganic additive as a further ingredient,
wherein the at least one inorganic additive comprises a transition alumina having a mean particle size d50 of at least 7.0 µm and a pore diameter of 4 nm to 30 nm.

2. The two-component mortar compound according to claim 1, wherein the at least one inorganic additive comprises at least the transition alumina as well as one or more further substances, which are selected from the group consisting of inorganic fillers, hydraulically binding compounds, polycondensable inorganic compounds, modifiers and mixtures thereof.

3. The two-component mortar compound according to claim 1, wherein the at least one inorganic additive comprises a filler.

4. The two-component mortar compound according to claim 1, wherein the at least one inorganic additive comprises a hydraulically binding or polycondensable inorganic compound.

5. The two-component mortar compound according to claim 1, wherein the at least one inorganic additive further comprises an inorganic modifier.

6. The two-component mortar compound according to claim 1, wherein the transition alumina is present in the mortar compound in a proportion of 0.5 to 10 percent by volume.

7. The two-component mortar compound according to claim 1, wherein the mean particle size d50 of the transition alumina is at least 12.0 μm.

8. The two-component mortar compound according to claim 1, wherein the polymerization shrinkage of the mortar compound is less than 3.1%.

9. The two-component mortar compound according to claim 1, wherein the transition alumina has a mean particle size d50 of up to 120 μm.

10. The two-component mortar compound according to claim 1, wherein the transition alumina has a pore diameter in a range of 4.5 nm to 20 nm.

11. The two-component mortar compound according to claim 1, wherein the at least one inorganic additive, including the transition alumina, are present in the mortar compound in a proportion of 50 to 80 percent by weight relative to the total weight of the compound.

12. The two-component mortar compound according to claim 1, wherein the free-radical-curing resin comprises a urethane (meth)acrylate resin and/or a (meth)acrylate-modified epoxy resin.

13. The two-component mortar compound according to claim 1, wherein the resin component (A), comprises
at least one polymerization inhibitor which is a phenolic compound, and
optionally, a non-phenolic compound selected from the group consisting of stable free radicals, phenothiazines and mixtures thereof.

14. The mortar compound according to claim 13, wherein the at least one polymerization inhibitor comprises a phenolic compound, which is able to bind to the transition alumina.

15. The two-component mortar compound according to claim 1, wherein the hardener component (B) is anhydrous.

16. The two-component mortar compound according to claim 1, wherein the resin component (A) comprises:
a free-radical-curing resin in a proportion of 5 to 45 wt %;
a reactive diluent in a proportion of 0 to 25 wt %;
an accelerator in a proportion of 0 to 3 wt %;
a polymerization inhibitor in a proportion of 0 to 5 wt %; and
at least one inorganic additive in a proportion of 50 to 80 wt %;
wherein the sum of all proportions adds up to 100 percent by weight, and wherein the inorganic additive comprises at least one transition alumina having a mean particle size d50 of at least 7 μm and a pore diameter of 4 nm to 30 nm.

17. The two-component mortar compound according to claim 1, wherein the mortar compound obtained by mixing the resin component (A) and the hardener component (B) comprises:
a free-radical-curing resin in a proportion of 5 to 50 wt %;
a reactive diluent in a proportion of 0 to 25 wt %;
an organic peroxide in a proportion of 0.5 to 5 wt %,
a polymerization accelerator in a proportion of 0 to 0.5 wt %;
at least one transition alumina in a proportion of 2 to 20 percent by weight;
further inorganic additives in a proportion of 10 to 78 wt %; and
water in a proportion of 0 to 10 wt %;
wherein the sum of all proportions of the compound adds up to 100 percent by weight.

18. The two-component mortar compound according to claim 3, wherein the tiller is selected from the group consisting of quartz, glass, corundum, porcelain, stoneware, heavy spar, light spar, gypsum, talc, chalk and mixtures thereof.

19. A method for chemical fastening of a structural part, comprising:
contacting said structural part with the two-component mortar compound according to claim 1,
wherein said structural part is a threaded anchor rod, a rebar, a threaded sleeve or a screw in a drilled hole which is present in a mineral substrate.

* * * * *